(12) United States Patent
Behm

(10) Patent No.: US 6,170,350 B1
(45) Date of Patent: Jan. 9, 2001

(54) GEAR REDUCER DRIVE ASSEMBLY

(75) Inventor: Philip H. Behm, Arden, NC (US)

(73) Assignee: Perfection Gear, Inc., Ashville, NC (US)

( * ) Notice: Under 35 U.S.C. 154(b), the term of this patent shall be extended for 0 days.

(21) Appl. No.: 09/327,689

(22) Filed: Jun. 8, 1999

(51) Int. Cl.[7] ................................ F16H 1/16; F16H 1/20
(52) U.S. Cl. ........................................................ 74/425
(58) Field of Search .......................... 74/425, 606 R; 212/247, 248

(56) References Cited

U.S. PATENT DOCUMENTS

| | | |
|---|---|---|
| 2,313,084 | 3/1943 | Manly . |
| 2,364,951 | 12/1944 | Corte . |
| 3,369,672 | 2/1968 | Lorence . |
| 3,539,053 | 11/1970 | Lado et al. . |
| 3,861,243 | 1/1975 | Fleischer et al. . |
| 3,990,539 | 11/1976 | Marit . |
| 4,185,513 | 1/1980 | Ewart et al. . |
| 4,391,477 | 7/1983 | Morrow, Sr. . |
| 4,622,860 | 11/1986 | Carnetti et al. . |
| 4,779,364 | 10/1988 | Holmdal . |
| 4,797,060 | 1/1989 | Kishi et al. . |
| 5,040,428 | 8/1991 | Miyaoka et al. . |
| 5,163,570 | 11/1992 | Mundis et al. . |
| 5,832,780 | * 11/1998 | Gallienne ................ 74/425 |

OTHER PUBLICATIONS

Worm box swing drive.
Worm swing drive.

* cited by examiner

*Primary Examiner*—Dirk Wright
(74) *Attorney, Agent, or Firm*—David A. Tamburro

(57) ABSTRACT

A combined worm/spur gear reducer drive assembly for rotating an upper support plate, for example, the boom plate of an aerial lift truck with respect to a stationary lower support, for example, the bed of the truck. The drive assembly includes a one-piece member forming a housing section containing the primary and secondary gear sets and a securing ring mounted between the inner race of a turntable bearing and fixed to one of the upper or lower plates, the outer race of the bearing being secured to the other plate. Spur gear teeth are provided on the external surface of the outer race and the secondary set includes a spur pinion engaging the gear teeth. The one-piece casting and the gear sets housed therein are mounted in the space between the boom plate and the bed plate.

11 Claims, 4 Drawing Sheets

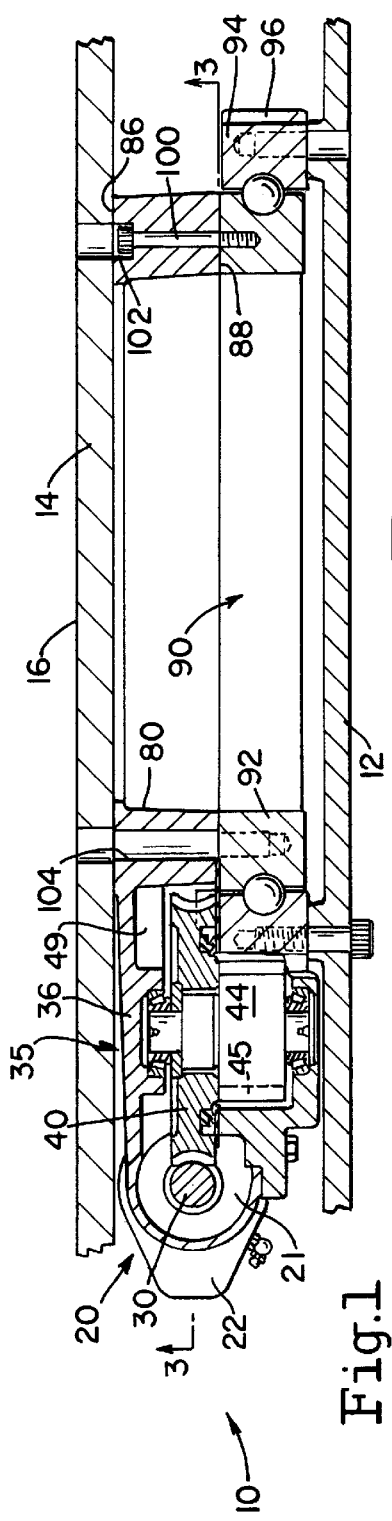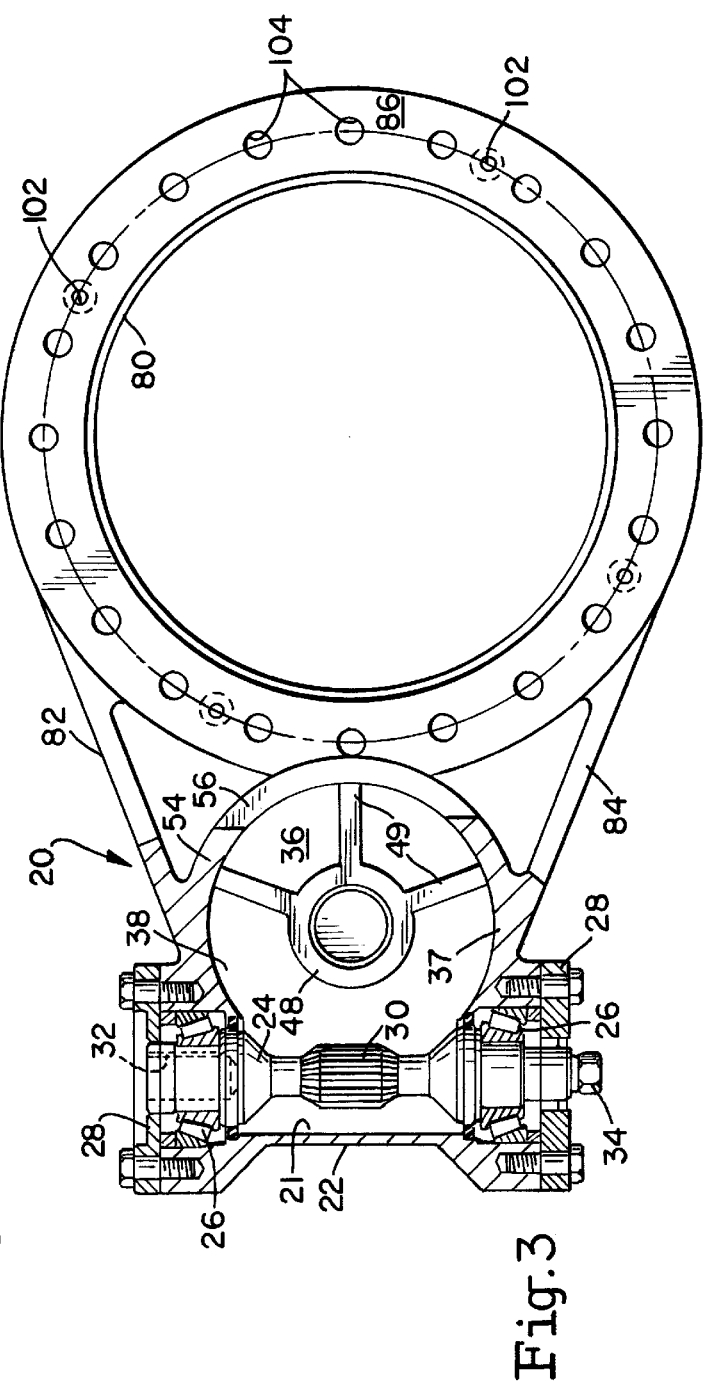

GEAR REDUCER DRIVE ASSEMBLY

BACKGROUND OF THE INVENTION

This invention relates generally to speed gear reducer drive assemblies and, more particularly, to a novel gear reducer assembly for use on the boom of aerial lift trucks. The novel assembly includes a primary worm gear set and a secondary spur gear set mounted within a common one-piece housing.

In aerial lift trucks, a top boom plate is rotatably mounted with respect to a lower truck plate by way of an intermediate turntable bearing. The top boom plate is connected to the inner race of the turntable bearing and the outer race is fixed to the truck plate. Currently, there are two drive configurations used in the market place for rotating the boom plate on aerial lift trucks. Each of those has distinct drawbacks. In one drive configuration, a gear reducer is externally mounted on the top boom plate and includes a drive spur pinion which extends downwardly through the boom plate and drivingly engages spur gear teeth formed on the external face of the large diameter outer race of the turntable bearing. This type of drive assembly encounters a number of problems. For example, the top surface of the boom plate must be machined to accommodate a mounting plate for the reducer. The overhung drive pinion often causes misalignment and uneven wear on both the pinion and the turntable bearing, and holding the reducer down to resist rotation requires the use of jack bolts.

Another drive configuration, known as a swing drive, includes a worm gear reducer mounted directly between the boom plate and the truck plate, the Another drive configuration, known as a swing drive, includes a worm gear reducer mounted directly between the boom plate and the truck plate, the worm engaging against a helical gear formation on the external surface of the outer race of the turntable bearing. This configuration is substantially less expensive than the externally mounted reducer, but suffers from low torque rating, poor life due to point contact between the worm and turntable bearing, causing high wear on the turntable bearing due to high contact stresses. In addition, performance problems such as backlash and "slip sticking" occur when turning down a slope due to high friction and loads bearing on the conventional steel worm and steel helical gear.

The combined spur/worm swing drive assembly of the invention was developed to overcome those problems.

SUMMARY OF THE INVENTION

Accordingly, the primary object of this invention is to provide a novel spur/worm swing drive assembly particularly useful for rotating the boom on aerial lift trucks, the drive assembly being significantly cheaper to produce than the conventional externally mounted reducer while at the same time delivering much higher output than the conventional worm swing drive. The unique drive assembly provides an attractive choice for large swing drive applications experiencing performance problems and also for smaller reducer applications where cost is a concern.

The novel drive assembly of the invention accomplishes its objectives by providing a primary worm gear reduction set driving a secondary spur gear reduction set which includes a spur pinion rotating against spur teeth formed on the external surface of the large diameter outer race of the turntable bearing which is fixed to the truck plate. The primary worm gear set and the secondary spur gear set are assembled within a common, one-piece support and the entire assembly is readily positioned and supported in the space between the top boom plate and the lower truck plate. This assembly affords a number of advantages. For example, the amount of machining required on mounting surfaces is substantially reduced. The spur pinion does not overhang from the boom plate, but rather is mounted on a common shaft with the worm gear and the shaft is supported at its upper and lower ends within bearings. Thus, there is no misalignment or uneven wear between the spur pinion and the spur gear teeth formed on the outer race of the turntable bearing. The line contact between the spur pinion and the spur gear formed on the turntable bearing reduces wear between those mating parts. In the primary worm gear set, the worm is constructed from steel and the worm gear is bronze, thus eliminating slip stick.

The one-piece support member of the invention acts as a mounting surface on the turntable bearing and also as the housing for the worm gear, the worm, and the spur pinion. This eliminates any chance of lateral movement between the spur pinion and the gear teeth on the outer race of the turntable bearing during operation of the gear reducer. The worm of the primary set has one end connected to an hydraulic drive motor and has a hex extension at its opposite end to allow for manual operation of the worm gear set if necessary.

To facilitate assembly with the truck and boom plates, the combined worm/spur reducer unit and its hydraulic motor drive can be pre-assembled in the one-piece member and then fastened on the inner race of the turntable bearing, the outer race of which is already bolted to the truck plate or bed. The boom plate is then placed on the top surface of the housing of the unit and bolted down to the housing and the inner race.

Other objects and advantages of the invention will become apparent from reading the following detailed description of the invention wherein reference is made to the accompanying drawings.

BREIF DESCRIPTION OF THE DRAWINGS

FIG. 1 is a fragmentary sectional elevational view of the novel combined worm/spur gear drive assembly of the invention mounted in place between a is fixed truck bed plate and a rotatable boom plate, for example on an aerial lift truck;

FIG. 3 is a fragmentary sectional view taken generally along line 3—3 of FIG. 1;

DETAILED DESCRIPTION OF THE INVENTION

Figure 2:
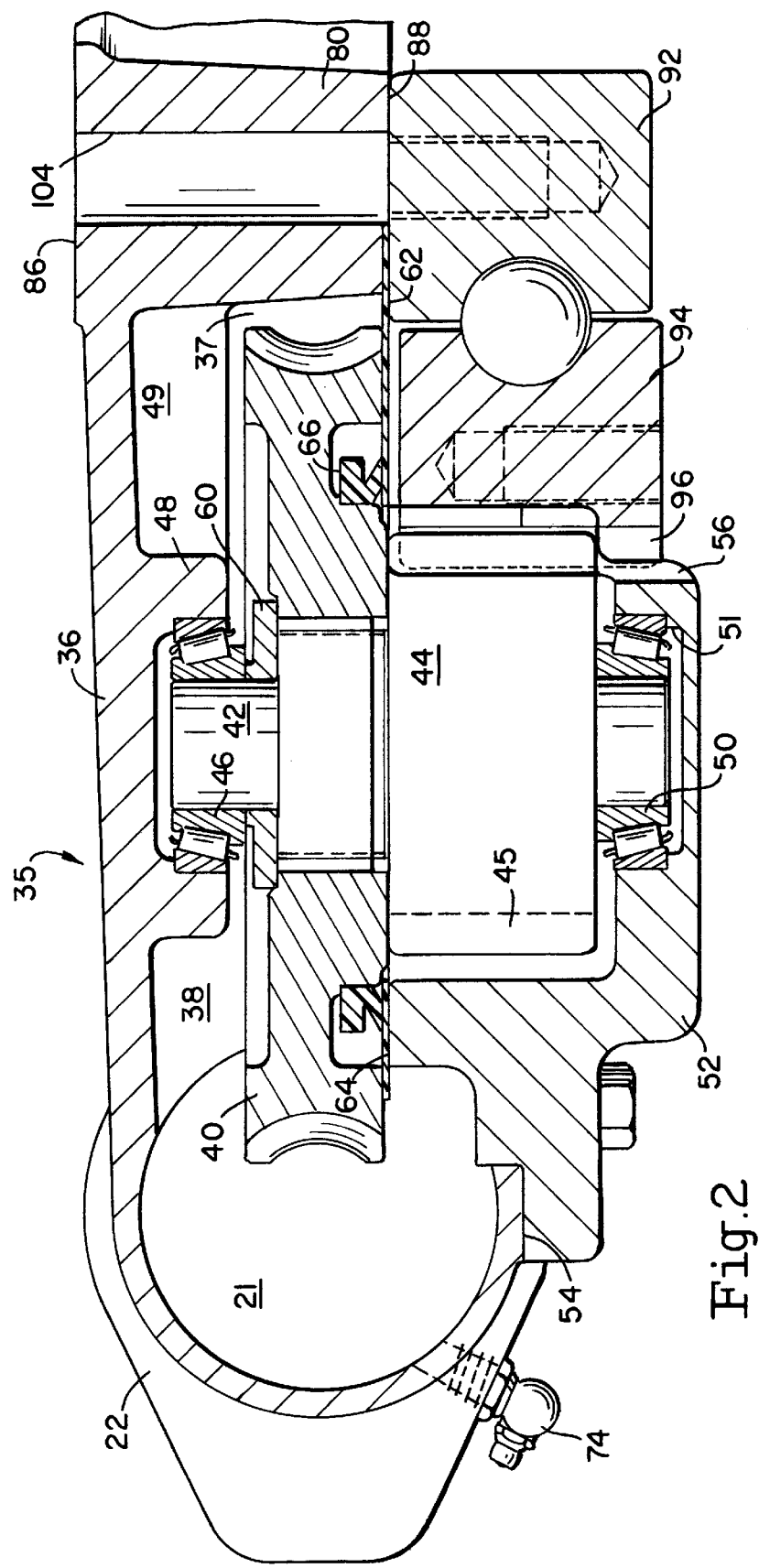
FIG. 2 is an enlarged fragmentary sectional view of the drive assembly illustrated in FIG. 1.
Figure 4:
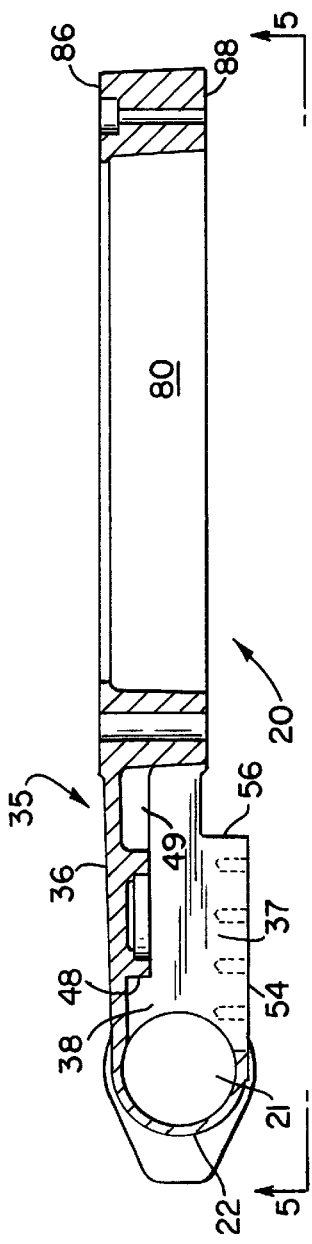
FIG. 4 is a fragmentary elevational view of the one-piece cast member in which the entire gear reduction unit is mounted.
Figure 5:
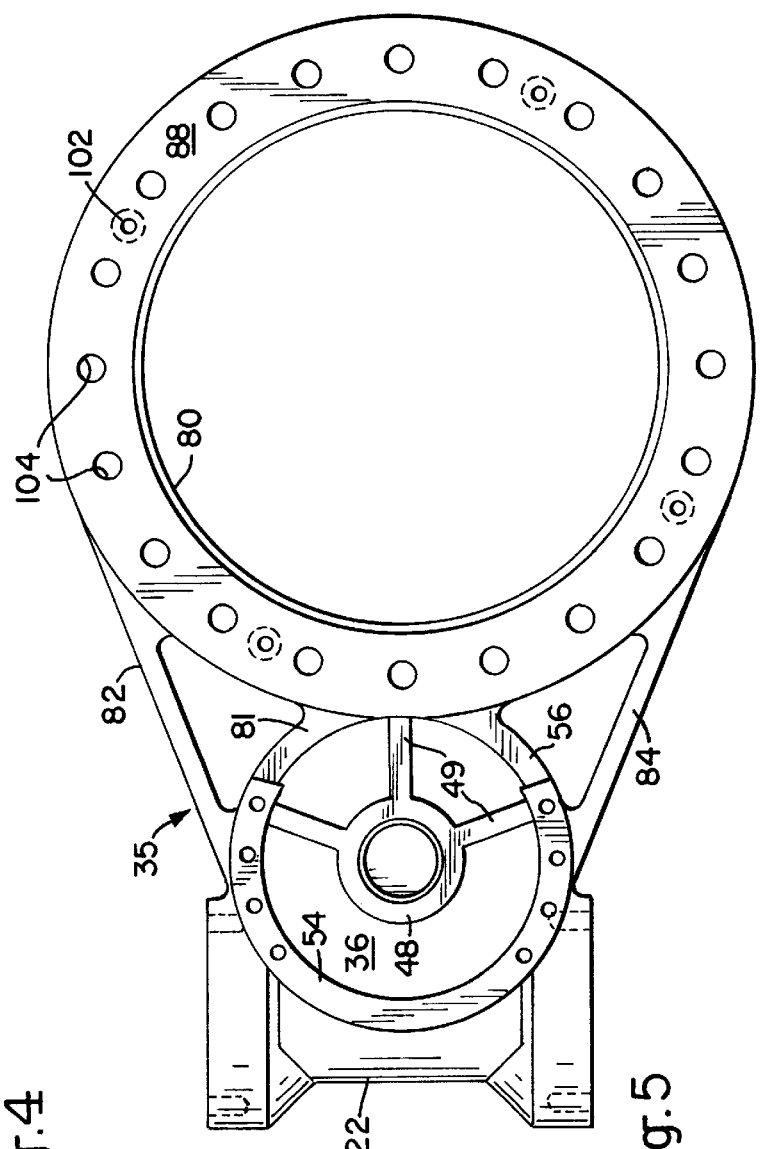
FIG. 5 is a bottom view of the housing taken along line 5—5 of FIG. 4.
Figure 6:
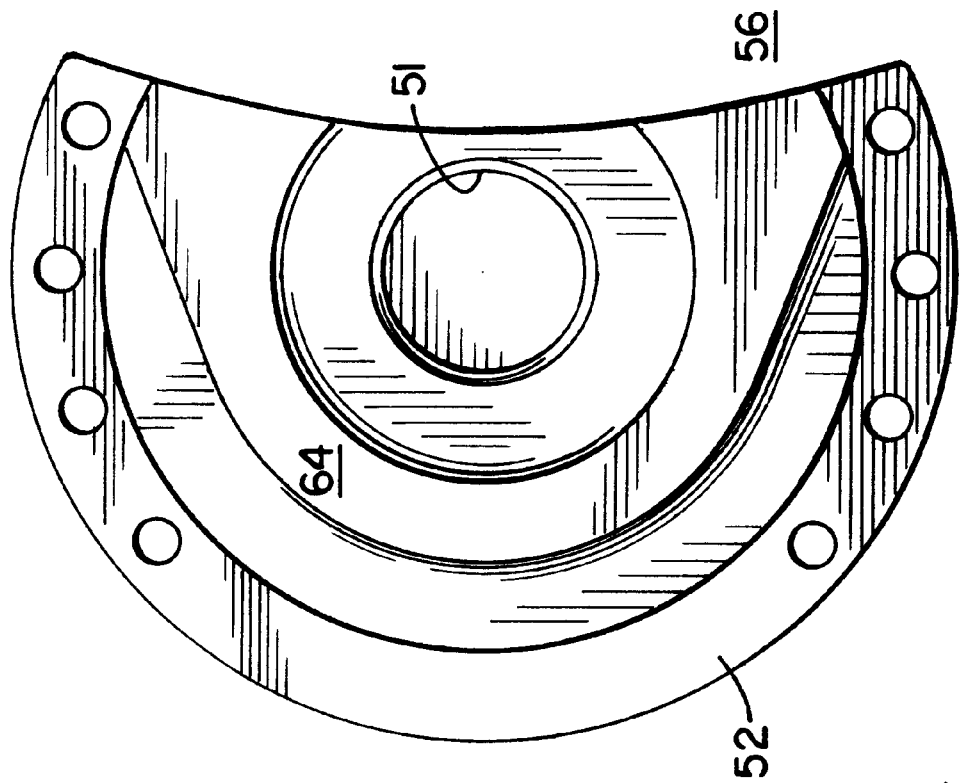
FIG. 6 is a plan view looking down into the gear cap attached to bottom of the one-piece member.

Referring now to the drawings, a combination worm/spur gear reduction unit 10 is mounted in place between a first stationary truck bed plate 12 and a second rotatable boom plate 14, on the upper surface 16 of which an aerial lift mechanism of a truck may be mounted.

Unit 10 includes a one-piece cast member 20 having a horizontal end section 22 defining a chamber 21 containing a horizontal steel worm shaft 24 rotatably mounted about a horizontal axis parallel to plate 16 within opposite ends of section 22 via bearings 26 held in place by bearing caps 28. A worm 30 is machined directly on the center portion of the shaft 24. One end 32 of shaft 24 is bored and keyed or splined to receive the output shaft of a standard hydraulic drive motor, while the other end 34 of shaft 24 is formed with a hex head extension so that shaft 24 and worm 30 may be rotated manually if necessary.

Casting 20 has an intermediate, generally cylindrical section 35 having a top wall 36 and a part-cylindrical side wall 37 defining a chamber 38 which is in open communication with chamber 21.

A bronze worm gear 40 is fixed on a vertical shaft 42 and has teeth which mesh with steel worm 30. Shaft 42 is rotatably mounted at its upper end by a bearing 46 within hub 48 formed integrally on wall 36, and at its lower end by a bearing 50 mounted in bore 51 of a bearing cap 52 which is fixed to the circular bottom face 54 of wall 37. A spur pinion 44 is machined directly on shaft 42 between worm gear 40 and bearing 50. Bearing cap 52 and wall 37 extend around through about 220 degrees and provide an inner open area 56 through which the spur teeth of pinion 44 are exposed. A washer 60 is mounted on shaft 42 between bearing 46 and worm gear 40. A grease retainer ring 62 is mounted between the upper face 64 of cap 52 and the lower face of worm gear 40 and a grease seal 66, mounted on the hub of worm gear 40, rides on retainer 62.

The entire assembly including shaft 42, washer 60, worm gear 40, spur pinion 44, retainer ring 62 and grease seal 66 are maintained in place between bearings 46 and 50 by tightening cap 52 against face 54.

Grease is fed to the chambers 21 and 38 housing the primary gear set including shaft 24, worm 30 and worm gear 40 by a grease fitting 74 and is retained within those chambers by ring 62.

From the above description, it is apparent that sections 22 and 35 of casting 20 form a housing for the various components of the primary and secondary reduction units.

Casting 20 also includes a large securing ring section 80 connected to top wall 36 at 81 and to side wall 37 by gussets 82 and 84, with ring 80 having upper and lower machined faces 86 and 88, respectively. A plurality of ribs 49 extend radially from hub 48 to side wall 37 and ring 80 to reinforce section 35 of casting 20.

A turntable bearing 90 has an inner race 92 and an outer race 94 bolt connected and fixed to bed plate 12, with the outer race 94 having spur gear teeth 96 formed therearound.

During assembly, ring 80 is secured to inner race 92 by four cap screws 100 which extend downwardly through counterbored holes 102 and thread into race 92. Holes 102 have enough clearance around cap screw 100 to permit ring 80 and pinion 44 to be shifted laterally into proper engagement with teeth 96 to eliminate backlash between teeth 45 and teeth 96. When the teeth are properly set, screws 100 are tightened down. Plate 14 is then fastened on the top face 86 of ring 80 by a plurality of bolts which extend down through the plate, through openings 104 in ring 80 and thread directly into inner race 92, thus retaining pinion 44 in proper operating position with respect to teeth 96.

As sown in FIGS. 1 and 2, spur gear teeth 45 on pinion 44 mesh with spur teeth 96 on the larger diameter outer race 94 to form the secondary spur gear reducer set. Consequently, as worm shaft 94 is driven by an appropriate hydraulic motor connected to end 32, worm 32 rotates large diameter worm gear 40 of the primary reducer set to rotate shaft 42 and pinion 44, and pinion teeth 45 engage against teeth 96 formed on the fixed outer race 94 of turntable bearing 90 to rotate the entire casting 20, inner race 92, and boom plate 14 with respect to outer ring 94 and bed plate 12.

It should be understood that the orientation of unit 10 as described above and illustrated in FIG. 1 of the drawings is for illustrative purposes only. For example, unit 10 may be turned upside down between plates 12 and 14 so that ring 80 and inner race 92 are fixed to the first lower stationary plate 12 and outer race 94 is fixed to the second upper rotatable plate 14. In this orientation, as pinion 44 rotates, it rotates outer race 94 and plate 14 with respect to stationary inner race 92 and member 20.

The forgoing relates to preferred exemplary embodiments of the invention, it being understood that other variants and embodiments thereof are possible within the spirit and scope of the invention, the latter being defined by the appended claims.

What is claimed is:

1. In combination with stationary first support means and second support means spaced from said first support means and rotatable with respect thereto, a gear reducer drive assembly comprising a primary worm gear set drive connected to a secondary spur gear set which includes a spur pinion, a turntable bearing mounted between said first and second support means and having inner and outer races, said inner race being connected to one of said first and second support means and said outer race being connected to the other of said first and second support means, the external surface of said outer race having spur teeth formed thereon, means for mounting said gear reducer drive assembly between said first and second support means so that said spur pinion engages said teeth on said outer race.

2. The combination of claim 1, said mounting means including a housing section for containing said primary gear set and said pinion of said secondary set and a securing section connected between one of said first and second support means and said inner race.

3. In combination with stationary first support means and second support means spaced from said first support means and rotatable with respect thereto, a gear reducer drive assembly comprising a primary worm gear set drive connected to a secondary spur gear set which includes a spur pinion, a turntable bearing mounted between said first and second support means and having inner and outer races, said inner race being connected to one of said first and second support means and said outer race being connected to the other of said first and second support means, the external surface of said outer race having spur teeth formed thereon, means for mounting said gear reducer drive assembly between said first and second support means so that said spur pinion engages said teeth on said outer race, said mounting means being a one-piece member including a housing section for containing said primary gear set and said pinion of said secondary set and a securing section connected between one of said first and second support means and said inner race, said primary gear set including a first shaft mounted for rotation in said housing section about a generally horizontal axis, a worm on said first shaft and a worm gear, a second shaft mounted within said housing for rotation about a generally vertical axis, said worm gear being secured to said second shaft for engagement with said worm, said pinion being secured to said second shaft for engagement with the teeth on said outer race.

4. The combination of claim 3, said securing section including a ring fastened between one of said first and second support means and said inner race.

5. The combination of claim 4, wherein one end of said first shaft includes means for coupling said first shaft to a motor drive and the other end of said first shaft includes means facilitating manual rotation of said first shaft.

6. The combination of claim 3, wherein one end of said first shaft includes means for coupling said first shaft to a motor drive and the other end of said first shaft includes means facilitating manual rotation of said first shaft.

7. The combination of claim 3, comprising grease retainer means mounted between said worm gear and said pinion for retaining grease within said primary gear set.

8. The combination of claim 1, said inner race being connected to said second support means and said outer race being connected to said first support means.

9. The combination of claim 1, said inner race being connected to said first support means and said outer race being connected to said second support means.

10. In combination with stationary first support means and second support means spaced from said first support means and rotatable with respect thereto, a gear reducer drive assembly comprising a primary worm gear set drive connected to a secondary spur gear set which includes a spur pinion, a turntable bearing mounted between said first and second support means and having inner and outer races, said inner race being connected to said second support means and said outer race being connected to said first support means, the external surface of said outer race having spur teeth formed thereon, means for mounting said gear reducer drive assembly between said first and second support means so that said spur pinion engages said teeth on said outer race, said mounting means including a housing section for containing said primary gear set and said pinion of said secondary set and a securing section connected between said second support means and said inner race.

11. In combination with stationary first support means and second support means spaced from said first support means and rotatable with respect thereto, a gear reducer drive assembly comprising a primary worm gear set drive connected to a secondary spur gear set which includes a spur pinion, a turntable bearing mounted between said first and second support means and having inner and outer races, said inner race being connected to said first support means and said outer race being connected to said second support means, the external surface of said outer race having spur teeth formed thereon, means for mounting said gear reducer drive assembly between said first and second support means so that said spur pinion engages said teeth on said outer race, said mounting means including a housing section for containing said primary gear set and said pinion of said secondary set and a securing section connected between said first support means and said inner race.

* * * * *